Patented Sept. 15, 1925.

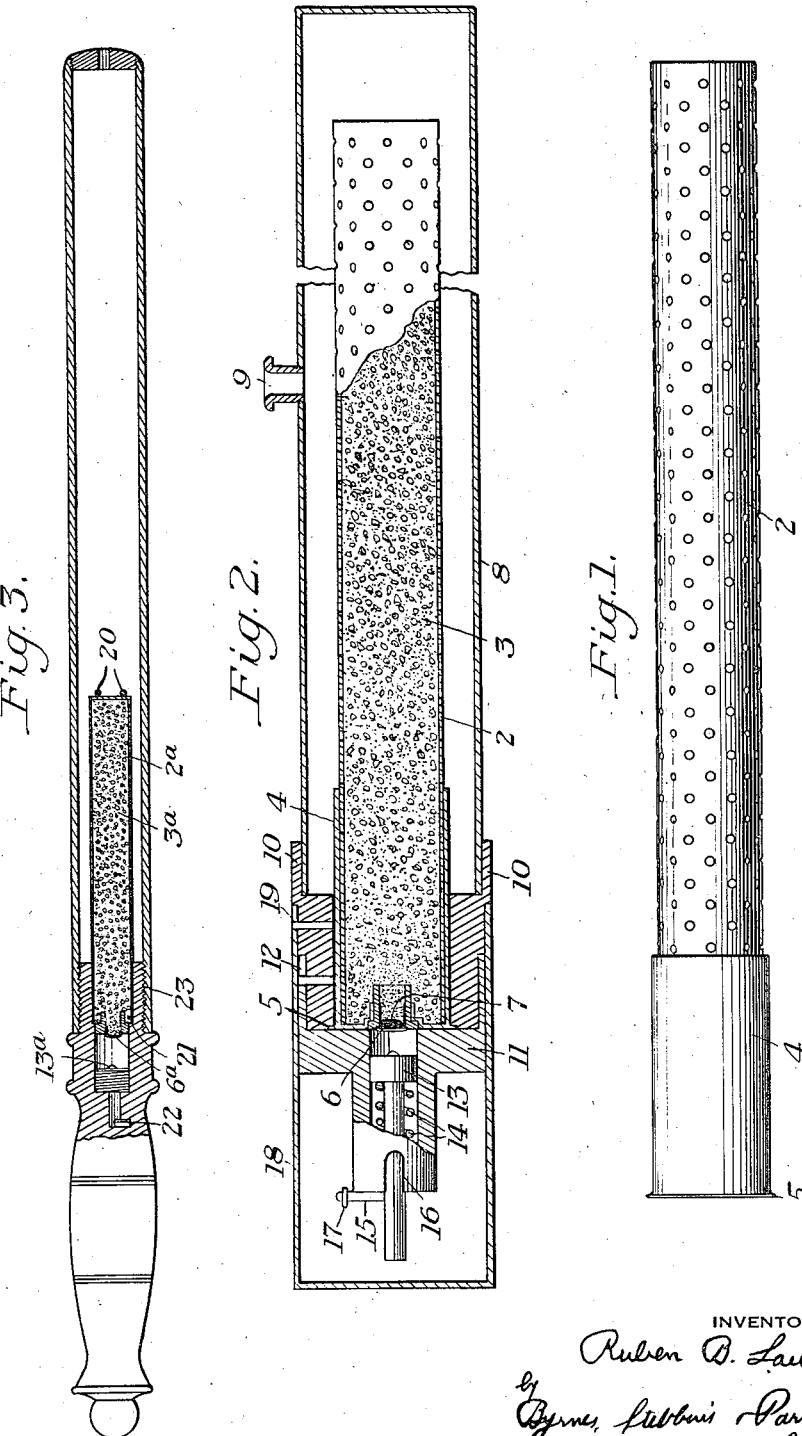

1,553,826

UNITED STATES PATENT OFFICE.

RUBEN B. LAWRENCE, OF BELLEVUE, PENNSYLVANIA, ASSIGNOR TO FEDERAL LABORATORIES, INC., OF PITTSBURGH, PENNSYLVANIA, A CORPORATION OF DELAWARE.

GAS CARTRIDGE.

Application filed May 8, 1924. Serial No. 711,833.

*To all whom it may concern:*

Be it known that I, RUBEN B. LAWRENCE, a citizen of the United States, residing at Bellevue, in the county of Allegheny and State of Pennsylvania, have invented a new and useful Improvement in Gas Cartridges, of which the following is a full, clear, and exact description.

This invention relates to a gas cartridge which may be utilized in various forms of defensive and offensive weapons, and is a continuation in part of my application, Serial No. 569,824, filed June 21, 1922.

I provide a removable gas cartridge for use in a gas emitting device containing a vaporizable gas producing substance and means for vaporizing the same. This gas producing substance may be of any desired kind and capable, for example, of producing a lacrymatory or a sternutatory gas or the like. If desired, it may be a substance which is capable of producing a gas, a fumigen or a smoke, and I use the word gas herein to include all these.

In my application Serial No. 569,824, of which this application is a continuation in part, I show an article carrying container provided with means for emitting a gas producing substance which may be set off upon attempted theft or robbery of the container. The gas producing substance and the means for vaporizing the same are carried in a removable cartridge which may be readily replaced after it has been expended or when it is desired to renew the same for any reason. This is highly desirable not only for the purpose of testing the apparatus, but also from a manufacturing point of view and because a fresh cartridge may be immediately put in place after the gas emitting device has been used and thus immediately put in condition for reuse.

In the accompanying drawings, which illustrate the preferred embodiment of my invention and two applications thereof,—

Figure 1 is a side elevation of a gas cartridge embodying my invention,

Figure 2 is a sectional view through the gas emitting device illustrated in my above mentioned application, Serial No. 569,824, and Figure 3 is a sectional view through a policeman's club showing a slightly modified form of the invention, this particular application of the use of an incapacitating gas being specifically described and claimed in my co-pending application Serial No. 604,450, filed December 1, 1922.

In the embodiment of the invention illustrated in Figures 1 and 2 there is shown a foraminous container 2 which is filled with a suitable mixture 3 of a vaporizable gas producing substance and means for vaporizing the same. If the gas which is to be produced is a lacrymatory gas I preferably use crystals of chloroacetophenone mixed with gun powder. When the gun powder is ignited it vaporizes the chloroacetophenone crystals and produces an extremely powerful lacrymatory gas. If desired, a quantity of magnesium oxide or other inert substance may be added to the mixture to retard combustion of the gun powder. The gas producing crystals and gun powder are preferably melted into a solid or sintered cake by heating to the temperature of boiling water so that loose material will not rattle through the holes of the container 2. The crystals and gun powder may also be caked together by moistening them with some solvent, such as benzene.

The term "gun powder" as here employed is intended as a term of general definition and not of limitation, and to include various kinds of gun powder or similar materials which are capable of self-supporting combustion in the absence of an outside supply of oxygen and produce a volume of gas.

One end of the foraminous container 2 is preferably encased in a shell 4 having a rim 5 and closely resembling an ordinary shot gun shell. It is provided with a cap 6 filled with fulminate of mercury or other detonating material, and is preferably surrounded with a primer 7 such as ordinary black powder or meal powder. The purpose of the primer is to insure a good start for the combustion of the gas producing mixture.

The cartridge may be utilized in a number of ways. For example, in Figure 2 the cartridge is shown as carried in a container 8 having a gas outlet 9. This particular form of apparatus may be employed in connection with an article carrying container or similar structure, the casing 8 being inside the container and the outlet 9 projecting through a wall thereof. The casing 8 terminates in a supporting ring 10 through which the cartridge is inserted until the rim 5 fits against the end of the supporting ring 10. The cartridge is held firmly in this position by a cover 11 removably secured to the supporting ring 10 by a bayonet joint 12. The cover 11 is provided with a striker 13 normally urged against the cap 6 by a heavy spring 14 and held against such movement by a pin 15. The cover 11 is further provided with a notch 16 adapted to receive the pin 15 when the striker 13 is rotated about its own axis. Such rotation may be effected by a cord 17 secured to the end of the pin and when the striker is so rotated the spring 14 moves it forcibly against the cap 6 and sets off the gas cartridge. A cap 18 secured to the supporting ring 10 by a bayonet joint 19 protects all the operating mechanism.

After the device has been used the expended cartridge may be removed by taking off the cap 18 in the cover 11 and sliding out the old cartridge. A new cartridge may be readily inserted, the striker re-set and the entire apparatus again assembled in a very short time.

Figure 3 shows a slightly modified form of cartridge adapted to be used in connection with a policeman's club. In this form of the invention similar parts are given the same reference characters with an *a* suffixed thereto. In this form of the invention the ring 5 is omitted and pins 20 formed in the policeman's club are used to hold the cartridge against longitudinal movement. Movement in the other direction is prevented by a shoulder 21 against which the other end of the cartridge bears. A finger operated pin 22 is provided for setting the striker 13ª into operation and discharging the cartridge. The cartridge may be readily replaced by unscrewing the joint 23 which secures the handle and body portions of the club together, slipping out the old cartridge and inserting a new one.

I thus provide a gas cartridge which may be readily applied to various gas emitting devices. The cartridge makes an exceedingly compact and convenient medium for the handling of the gas producing substance and operates a self-contained unit. It is only necessary to place this self-contained cartridge in the gas emitting device to have a complete operating unit, the necessity of tamping material into place in the apparatus itself being entirely done away with. The cartridge thus provided is capable of emitting gas in a gaseous form, as it is not intended to discharge a projectile, but to secure the necessary combustion in the cartridge itself for the production of the desired gas. The provision of the foraminous container is desirable on this account since it permits of combustion over substantially the entire surface of the cartridge whereby exceedingly high concentrations may be attained.

While I have illustrated a preferred form of my invention and two applications thereof, it will be understood that my invention is not limited to the illustrated form, but may be otherwise embodied within the scope of the following claims.

I claim:

1. A removable cartridge for use in a gas emitting device, containing chloroacetophenone and gun powder, and means for igniting the gun powder, substantially as described.

2. A removable cartridge for use in a gas emitting device, having a foraminous container and a gas producing substance, and a combustible therein in caked form, substantially as described.

3. A gas emitting device comprising a shell, a self-contained cartridge containing a gas producing substance and means for activating it, means for holding the cartridge in spaced relation to the shell, and means for setting off the activating substance, substantially as described.

4. A gas emitting device comprising a shell, a cartridge containing a gas producing substance, a material capable of self-supporting combustion arranged to heat and vaporize the gas producing substance, and a detonator for igniting the combustible material, a holder for positioning the cartridge within the shell, leaving an air space therearound, and a manually controlled hammer for striking the detonator to set off the gas, substantially as described.

5. A removable cartridge for use in a gas emitting device containing a vaporizable gas producing substance, together with means for vaporizing it, means for preventing discharge of the solid material in the cartridge when it is set off, and an outlet for the vaporized gas, substantially as described.

6. A removable cartridge for use in a gas emitting device containing a vaporizable gas producing substance, a combustible for vaporizing it, means for igniting the combustible, means for preventing discharge of the solid matter in the cartridge upon ignition thereof, and an outlet for the vapors emitted by the cartridge, substantially as described.

7. A self-contained removable cartridge for use in a gas emitting device containing a gas producing substance, the cartridge permitting discharge of gas but not permitting discharge of the gas producing substance, subtantially as described.

8. A removable gas generator for use in a gas emitting device, comprising a holder, a vaporizable gas producing substance and vaporizing means therein, both of them being secured against discharge by the holder, and means permitting discharge of gas from the holder, substantially as described.

9. A gas emitting device, comprising a body having a removable gas generator therein, the generator containing a gas producing substance and being adapted to permit discharge of gas but not of the gas producing substance, substantially as described.

In testimony whereof I have hereunto set my hand.

RUBEN B. LAWRENCE.